March 3, 1936.  R. F. BRADY  2,032,397
PROJECTION PRINTER
Filed Jan. 31, 1934
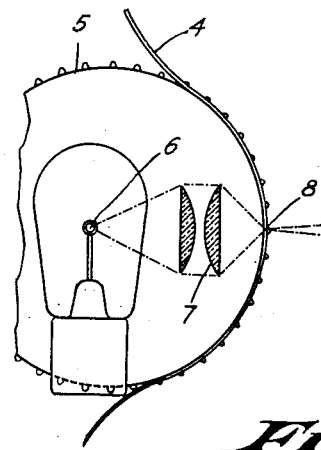
Fig. 1
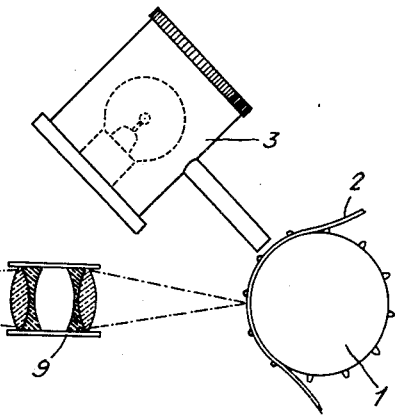
Fig. 3
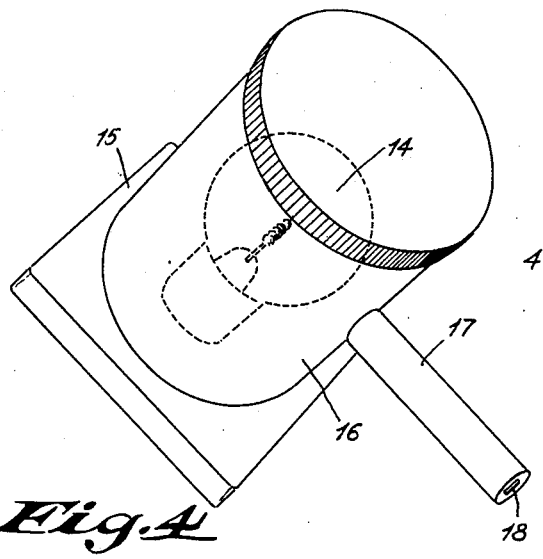
Fig. 2
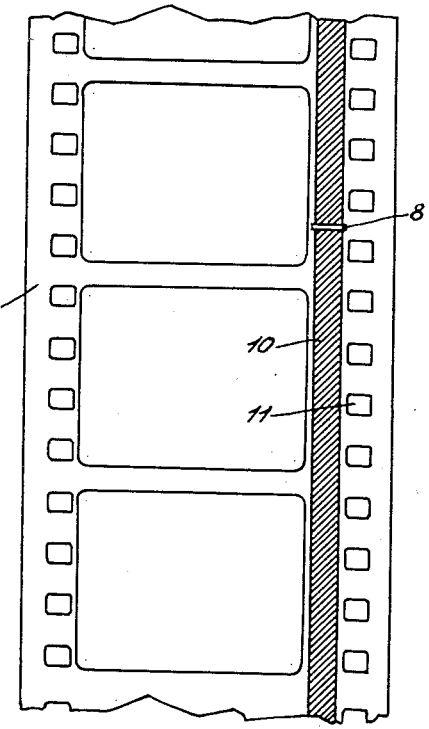
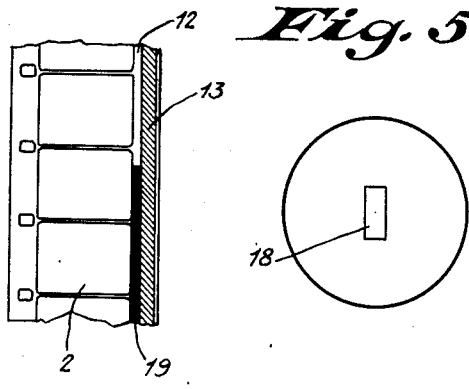
Fig. 4    Fig. 5
INVENTOR
RAYMOND F. BRADY
BY
ATTORNEY Patented Mar. 3, 1936

2,032,397

UNITED STATES PATENT OFFICE 2,032,397

PROJECTION PRINTER

Raymond F. Brady, Collingswood, N. J., assignor to Radio Corporation of America, a corporation of Delaware Application January 31, 1934, Serial No. 709,093

2 Claims. (Cl. 88—24)

The present invention relates to projection printers for printing photographic soundtrack from a negative film to a positive film on a reduced scale, and relates more particularly to an improved means for preventing interference with the reduced image of the soundtrack by images of either the picture or the sprocket holes on the larger negative.

One object of the invention is to provide means for eliminating from the reduced soundtrack image any extraneous images.

Another object of the invention is to provide means for producing a darkened margin at either or both edges of the soundtrack image.

Another object of the invention is to provide such a means for darkening the edges of a reduced soundtrack image which can be used in a projection printer during the printing operation.

Another object of the invention is to provide such a means attachable to a projection printer which can be used and adjusted without interfering with the operation of the printer itself.

Another object of the invention is to provide such an attachment for a projection printer which can be used or adjusted without interference from the operation of the printer.

Another object of the invention is to provide a novel method of printing photophonographic sound films.

In the drawing:

Fig. 1 is a diagrammatic illustration of the apparatus of my invention as applied to a projection printer for producing 16 mm. prints from 35 mm. negative film.

Fig. 2 is an enlarged view of my apparatus separate from the printing mechanism.

Fig. 3 is a diagrammatic illustration of the 35 mm. negative showing the relation of the printing light thereto.

Fig. 4 is an illustration of a 16 mm. projection print from such a negative as shown in Fig. 3 illustrating the application of my invention thereto.

Fig. 5 is an elevation of the aperture of my device.

In making projection prints of soundtracks from 35 mm. to 16 mm. film, it is necessary that the scanning line which illuminates the 35 mm. soundtrack be sufficiently long to cover the entire width of the soundtrack. The soundtrack is ordinarily close to the sprocket holes of the film, and also close to the pictures on a film, and if the adjustment and width of the scanning light is such as to at all times completely cover the soundtrack with sufficient extension therebeyond to allow for ordinary irregularities in the film or in the movement thereof, there is a tendency for the scanning light to produce images of the sprocket holes adjacent to the 35 mm. film on or immediately adjacent to the soundtrack of the 16 mm. film.

Due to the small size of the soundtrack on 16 mm. film, the optical system in the reproducer therefor ordinarily slightly overlaps the soundtrack at both edges. As a consequence, if images of the 35 mm. negative sprocket holes are printed upon the 16 mm. film, the images will be reproduced as sound from the 16 mm. film.

If the projection printer used in making the film is so adjusted as to completely avoid any reproduction of the sprocket holes, then a clear space is left between the soundtrack and the side of the picture on the 16 mm. film and, due to the aforesaid overlap of the 16 mm. sound reproducer, any silver grain, scratches, dirt, etc. on this clear area will be reproduced as sound or ground noise.

In order to avoid both of these undesirable effects, I provide an auxiliary optical system having an exposure aperture adjacent a point of uniform translation of the 16 mm. positive stock in the projection printer, and by means of this auxiliary optical system I expose a narrow strip of the positive film contiguous to the soundtrack and extending sufficiently far therefrom to cover up any sprocket hole images and to cover up any clear portion which might otherwise occur adjacent the soundtrack.

As shown in Fig. 1, my auxiliary optical system 3 is placed immediately adjacent to the sprocket 1 upon which the 16 mm. film 2 is printed and directly exposes the desired portion of the film. The 35 mm. film 4 is drawn at the proper speed by the sprocket 5 past the printing light 6 which, with its lens system 7, serves to produce an illuminated line at 8 upon the film 4. This illuminated line is focussed by the lens 9 in the form of reduced image upon the film 2.

As shown in Fig. 3, the illuminated line 8 overlaps slightly the sound-track 10 on the 35 mm. negative, and it will be apparent that the margin between this line and the sprocket holes 11 is very slight. If the optical system is adjusted so as to print only the soundtrack on a sufficiently reduced scale, a clear space 12 is produced adjacent the soundtrack 13 printed on the 16 mm. film as shown in Fig. 4.

As shown in Fig. 2, my device comprises a suitable exposing lamp 14 mounted upon a base 15 and enclosed within a suitable housing 16. Projecting from one side of this housing is a tube 17 which is provided with a rectangular aperture 18 of proper size and shape as shown in the enlarged view in Fig. 5.

When this device is mounted as shown in Fig. 1, it exposes the said clear space 12 of the film, thereby producing a blackened margin 19, Fig. 4, upon the soundtrack which not only prevents ground noise etc. due to the clear portion, but also serves to cover up any sprocket hole images if such should occur.

It will be apparent that my invention is not limited to the specific exposing means shown, but that I may use any appropriate exposure aperture or optical system to expose the desired portion of the film as, for example, an optical system producing a reduced image of the aperture 18, or I may locate the aperture on the side of the lens 9 away from the film 2, and thereby cause the lens 9 to image the aperture upon the film.

It will be further apparent that my invention is not limited to producing a darkened line upon the film between the soundtrack and the picture area, but that I may alternatively produce the blackened line at the other edge of the soundtrack or at both edges thereof. The reason that, in the preferred form of my invention, I blacken the area described is because the image of the soundtrack 10 is laterally reversed by the optical system in the projection printer and the images of the sprocket holes would therefore fall between the soundtrack and the pictures on a 16 mm. print, and it will be apparent that my invention is equally useful in eliminating any images of the picture frame-lines at the opposite edge of the soundtrack.

Having now described my invention, I claim:

1. A photographic printer comprising means for feeding a negative sound track film wherein the sound track is adjacent the sprocket holes therethrough, means for feeding positive film stock therethrough, means for directing light through said negative film to form an image of said sound track on said positive film stock, an auxiliary lamp located adjacent said means for feeding positive film stock for directly exposing the portion of said positive film stock laterally adjacent to said sound track image and corresponding to the sprocket hole area of said negative film, opaque means enclosing said lamp, a tubular shield extending from said opaque means into proximity with the positive film stock, and a closure provided with a rectangular aperture at the end of said tubular shield.

2. A photographic printer comprising means for feeding a negative sound track film wherein the sound track is adjacent the sprocket holes therethrough, means for feeding positive film stock therethrough, means for directing light through said negative film to form an image of said sound track on said positive film stock, an auxiliary lamp located adjacent said means for feeding positive film stock for directly exposing the portion of said positive film stock laterally adjacent to said sound track image and corresponding to the sprocket hole area of said negative film, opaque cylindrical means enclosing said lamp, a tubular shield extending radially from said cylinder into proximity with the positive film stock, and a closure provided with a rectangular aperture at the end of said tubular shield.

RAYMOND F. BRADY.